(12) United States Patent
Cochran

(10) Patent No.: US 7,710,107 B2
(45) Date of Patent: May 4, 2010

(54) FORCE OR FIELD BALANCE DEVICE AND METHOD FOR MEASURING POSITION

(76) Inventor: Gary Don Cochran, 2870 Page Ave., Ann Arbor, MI (US) 48104

( * ) Notice: Subject to any disclaimer, the term of this patent is extended or adjusted under 35 U.S.C. 154(b) by 116 days.

(21) Appl. No.: 11/795,194

(22) PCT Filed: Jan. 13, 2006

(86) PCT No.: PCT/US2006/001135

§ 371 (c)(1),
(2), (4) Date: Jul. 12, 2007

(87) PCT Pub. No.: WO2006/076522

PCT Pub. Date: Jul. 20, 2006

(65) Prior Publication Data

US 2008/0136405 A1 Jun. 12, 2008

(51) Int. Cl.
*G01R 7/14* (2006.01)

(52) U.S. Cl. .................. 324/207.11; 324/228; 324/260

(58) Field of Classification Search ............ 324/207.11, 324/207.13, 207.15, 207.17, 207.21, 207.22, 324/207.26, 251, 252, 228, 260
See application file for complete search history.

(56) References Cited

U.S. PATENT DOCUMENTS 4,622,644 A * 11/1986 Hansen ....................... 702/153

* cited by examiner

*Primary Examiner*—Reena Aurora
(74) *Attorney, Agent, or Firm*—George L. Boller

(57) ABSTRACT

A device and method for disclosing position of a positionable input by positioning the input over a range of positions to cause the magnitude of the directional component of a vector representing a field or force produced by a source to change from a reference magnitude or reference direction as the input is being positioned while an electric circuit that contains a sensor for sensing the directional component is changing the value of an electric signal for restoring the magnitude of the directional component being sensed by the sensor to the reference magnitude or reference direction, and using the value of the electric signal to disclose the position of the input.

26 Claims, 9 Drawing Sheets

FORCE OR FIELD BALANCE DEVICE AND METHOD FOR MEASURING POSITION

FIELD OF THE INVENTION

The present invention is directed to the field of electronic position measurement including pedal position, throttle position, seat position, and fuel level sensors.

BACKGROUND OF THE INVENTION

Measurement of position is required in many applications. The most common measurement sensor is probably a mechanical potentiometer whereby a position is functionally related to the position of a sliding wiper, movable over a resistive track. The wiper is moved by an actuator whose position is to be measured. Some applications require a large number of sequential measurements, resulting in destructive wear of mechanical potentiometer components.

Accordingly, the inventor believes that it's desirable to have an electronic, non-contact, angle or position sensor, thereby eliminating any mechanical wear between a sensor contact wiper and a resistive track.

Many inventions teach electronic means for measuring position, based upon a broad array of actuators and sensors functionally dependent on physical parameters that change with position. Specific examples of physical parameters and their functional relationships for measurement of position are capacitance, optical, magnetic, electromagnetic, inductive, strain and combinations of these parameters. U.S. Pat. No. 5,773,820 references optical, U.S. Pat. Nos. 6,756,779 and 6,483,295 reference inductive, U.S. Pat. Nos. 6,362,719 and 6,486,767 reference strain gages, U.S. Pat. Nos. 6,809,512, 6,806,701, 6,498,480, 6,779,389, 6,717,399, and 6,798,195 reference magnetic, U.S. Pat. No. 6,393,912 references electromagnetic and U.S. Pat. Nos. 5,736,865 and 6,118,283 reference capacitive.

Published Patent Applications US 2004/0003660, 2004/0168467, 2005/0217366, and 2005/0247124 teach an encapsulated, linear, magnetic sensor, sensing a varying magnetic field from an annular ring magnet diametrically magnetized that is rotated by an actuator. The linear output voltage can be converted to a pulse-width-modulated (PWM) signal for transmission.

A generally common technical thread running through these inventions is that a sensor puts out a signal that directly represents the measured parameter. The output signal may be linear or non-linear. If the signal is non-linear it may be processed to develop a linear result. If the signal is a simple change in voltage or resistance, a processing stage can convert the signal to another form for transmission, e.g. a voltage signal may be converted into PWM for transmission.

Another parameter measurement technique is a closed-loop electronic method, balancing or compensating a changing parameter value that can be sensed in a closed-, analog-, or digital loop rather than with a direct sensor output signal of a parameter measurement. In this case a second, controlled signal is used to generate a variable value of the parameter being measured. A sensor is used to detect the difference or superimposed interaction between the parameter signal to be measured and a secondary, controlled parameter value signal. When the controlled value and the unknown value match, i.e. balance, the sensor puts out a signal disclosing the match that is not dependent on the matching values. The value of the control signal needed for the secondary parameter value to match the unknown parameter value determines the value of the unknown signal. This is sometimes called a null or balance measurement. The parameter may be any generated physical signal such as from force, position, angle or magnetic field. A simple balance scale is an example of a force balancing measurement. An unknown weight in one tray is balanced by varying a known weight in the other tray until the scale pointer is at zero. The unknown weight then matches the known weight. The scale pivot only has to be good at zero balance. Accuracy is determined mostly by accuracy of the known weights that are used to balance the scale. The scale pivot reads zero at balance regardless of the weight being measured.

Force balance methods of measurement are well known to those skilled-in-the-art. U.S. Pat. No. 6,618,325 describes a single-coil geophone that uses a force-balance. U.S. Pat. No. 6,496,348 teaches a force-balance feedback measurement with a capacitive sensor. Magnetic field cancellation or balance for measuring current is taught in U.S. Pat. No. 4,596,950. Null detection is used in U.S. Pat. No. 6,750,751 develop an integrated circuit signal isolator, including a feedback coil coupled to the output of the magnetic field sensor.

A major advantage of these signal balance methods is that the sensor does not have to develop a highly linear output or have a low temperature drift at all values of the measured parameter; many sensors have zero or very low temperature coefficients near zero signal field. Its sensor should be highly repeatable at the value of the trip or trigger point that is usually, but not necessarily, at zero force or field. It's also desirable for the sensor to be very sensitive to any change in the measured parameter. Finally, its necessary for the compensating or balancing signal to be accurately controllable in order to determine the balance, e.g. the accuracy of known weights used on a weight balance scale. Although force or field balancing has been used in many fields, the inventor believes that a direct application to position, or angular measurement in a pedal position or fuel level sender application is not known. No single, electronic, non-contact angular measurement sensor has proven to be completely satisfactory for all vehicular applications, such as fuel level senders, throttle position sensors, and pedal position sensors. Per-unit cost, even in large volume, is often too great and becomes the limiting factor for commercial success of an electronic angle or position sensor for vehicles. Accordingly, the inventor considers it desirable to have a non-contact or long-life sensor for measuring angle or position that is cost competitive with mechanical methods.

SUMMARY OF THE INVENTION

This invention is primarily disclosed in the context of methods of angle measurement, but those skilled-in-the-art will see extensions to other parameter measurements such as position, velocity, acceleration, or electromagnetic field direction and strength, and restrictions are not to be inferred. Also, the measurement parameter discussed is a magnetic field, but other kinds of fields or parameters can be measured using a similar means. The invention can be used with any force or field that can be made to interact with a secondary force or field, the secondary value being controlled by a sensor signal output. The sensor is a component in a closed-loop control circuit with the sensor output a function of the interaction between the primary parameter value and the secondary value. The control may be a direct change in magnitude of the secondary parameter or a change caused by physically repositioning a secondary component.

The main embodiment is with vector components, such as a force or a magnetic field. A vector force example is a weight hanging vertically on a spring. The weight may displace a point attached to the weight a vertical distance fro a fixed position sensor. A balancing force, such as a magnetic solenoid pulling up on the weight, may be used to raise the unknown weight until the sensor senses the same point as before movement; the weight is balanced by the restoring force. The value of current applied to the solenoid that's needed to raise the weight and restore the position is a measure of the unknown weight.

An example of using the invention with a non-vector field is capacitance, as in a radio condenser. A knob is used to rotate a set of metal plates with respect to a fixed set of plates; the capacitance change used to selectively tune a radio. The angle defines the value of capacitance, and an electric field across the plates can be used to measure said capacitance. With my invention a secondary condenser can have an electronically controlled rotation until the electrical field measured in the first case matches the electric field generated in the second case. At balance, the angle of the second condenser set of plates can be known from a correlated value of the secondary control circuit.

The invention provides an actuator, a sensor, and a means for developing a force or field in a closed loop that uniquely compensates or balances a measurement parameter developed as a result of an actuator rotation. The strength of a controllable balance signal, such as an electric current, is adjusted by the closed-loop until the sensor output is at a zero value in some embodiments or fixed state values, such as on-off or a pre-determined value, in other embodiments. The measurement parameter and the balance parameter are in interaction or superposition in the detection region of the sensor.

In a preferred embodiment, a magnetic sensor is rotated by an actuator about a pivot point within the magnetic flux of a coil or solenoid, a fixed permanent magnet provides a reference magnetic field, and the magnetic field developed by current in the coil interacts with the reference magnetic field in the detection region of the sensor. The vector superposition of the two magnetic fields and the null direction of the sensor are essentially in the same plane. The sensor can be placed within a field of a wound bobbin such as found in an air-core gauge for vehicular instrumentation, e.g. U.S. Pat. Nos. 4,492,920, 4,992,726 and 6,132,532. The sensor can be placed near the center of the air-core bobbin, in place of the usual rotor and staff used in vehicular gauges. The coil field direction is fixed with respect to the direction of the field of the reference magnet or magnets and the magnetic field from said coil is in the same detection region of the sensor as the magnet field.

Current in the coil is adjusted to develop a field as a component of an electronic closed-loop so that the resultant field at the sensor is zero or alternatively at a fixed voltage trigger point depending on the particular embodiment. The magnetic field from the coil is used to cancel the field from the permanent magnet at the sensor.

A preferred embodiment uses a novel angular relationship between the angle of the field from the permanent magnet and the fixed angle of the field within the coil. The preferred choice for linearity of sensor angle and current in the coil is 120 angular degrees. The electronic closed-loop controls the current in the coil with inexpensive electronics, not requiring complex interface electronics for temperature compensation. The coil current needed to balance the signal is a measure of the angle of the sensor as it's rotated by the actuators. A current adjustment is needed to change the resultant angle developed by the two superimposed magnetic fields. Examples of magnetic field sensors are giant magnetic resistance (GMR), anisotropic magnetic resistance (AMR), Hall-effect, and flux gate. It's also possible to use a simple mechanical switch such as a reed relay, sensitive to a magnetic field.

A GMR magnetic field sensor changes resistance as a function of the magnitude of an external magnetic field, directed through the sensor. It has a preferred sensitivity direction. If a magnetic field is aligned perpendicular to this direction, the output is zero. When the magnetic field is aligned with the sensitive direction, the output for a zero field is also zero. Under both conditions, the resistance is very stable and has a low temperature coefficient. A basic resistive bridge arrangement delivers an output voltage of zero when the field is zero.

A preferred embodiment uses a magnetic sensor with a single trigger point between two states. It acts like a voltage switch. The switch functions to continually adjust the external field resultant direction to keep the sensor switching between these two states. One state causes the feedback loop to increase current in the compensatory coil, thereby increasing the magnetic field within the coil, the other state causes the current to change so as to decrease the coil field strength. At a sufficiently high frequency of current modulation, the modulated current may be processed to provide an average value of approximate steady-state value of current or voltage. This closed-loop control signal maintains an equilibrium balance of force, torque, or electromagnetic fields as determined by a simple magnetic switching element. The field generating parameters of voltage or current needed to develop and maintain this balance is a measure of the angle or position of the moveable component.

A Hall-effect sensor with a single switching value is currently being used in cell phones for turning on the cell phone when the clamshell case is opened. It's supplanting a magnetic reed switch for this application. An example device of such a device is one sold by Allegro Microsystems, Inc. in Worchester, Mass. as Product No. A3245, a chopper stabilized, omnipolar Hall-effect switch that can be used in such an embodiment of the invention. That device is advertised with extremely low switchpoint drift and with superior temperature stability. These are especially desirable characteristics for this embodiment of the invention.

In an alternative embodiment a single mechanical contact is maintained, with a desired design as a single long-life contact. Since magnetic reed relays have been made with switched repetitions in the billions of cycles, such a switch can be used in some embodiments without being too restrictive to other considerations. The intent is to use a simple switch closure to direct flow of current through a coil, thereby balancing a field as described above. The arrangement is for an actuator to rotate a permanent magnet which, in turn, applies a torque to a second magnet thereby closing a switch. The closed switch directs current through a coil that is positioned to return the second magnet to it's open position. The alternating opening and closing of the switch produces a pulse width modulated (PWM) signal current where the average current is a measure of the actuator angle. The larger the actuator angle, the greater the torque needed to return the second magnet to its initial position. An integrated circuit need not be used in this embodiment.

Another embodiment is to use a fixed sensor position with a rotating magnet, and an angular relationship between the permanent magnet field and the coil different from 120 angular degrees. In fact, the magnet field and the coil field may be variable.

An embodiment that greatly increases the strength of the magnetic field at the sensor is to rotate a magnet by means of a coil field. The strength of the coil field can be much lower than normally required to trigger the sensor, but it's sufficient to rotate the magnet as occurs in air-core gauges. The strength of the magnet supplies the energy needed to trigger the sensor. At any angle at which the actuator rotates the sensor, the field from the coil causes a rotation of the magnet until the sensor puts out zero or alternatively a signal indicating a fixed trigger point, depending on specific embodiment.

A magnetic shield is often required with the use of a sensitive sensor. This is well-known to anyone skilled-in-the-art, and many methods of shielding is known.

One generic aspect of the invention relates to a position disclosing device comprising: an electric circuit containing a sensor for sensing a directional component of a vector representing a field or force produced by a source; a positionable input for relatively changing the directional component of the vector from a reference magnitude or reference direction as the input is being positioned over a range of positions while the electric circuit is changing the value of an electric signal for restoring the directional component being sensed by the sensor to the reference magnitude or reference direction; and an output providing for the value of the electric signal to disclose the position of the input.

Another generic aspect relates to a method for disclosing position of a positionable input comprising: positioning the input over a range of positions to cause the magnitude of the directional component of a vector representing a field or force produced by a source to change from a reference magnitude or reference direction as the input is being positioned over a range of positions while an electric circuit that contains a sensor for sensing the directional component is changing the value of an electric signal for restoring the magnitude of the directional component being sensed by the sensor to the reference magnitude or reference direction; and using the value of the electric signal to disclose the position of the input.

DETAILED DESCRIPTION

Figure 1:
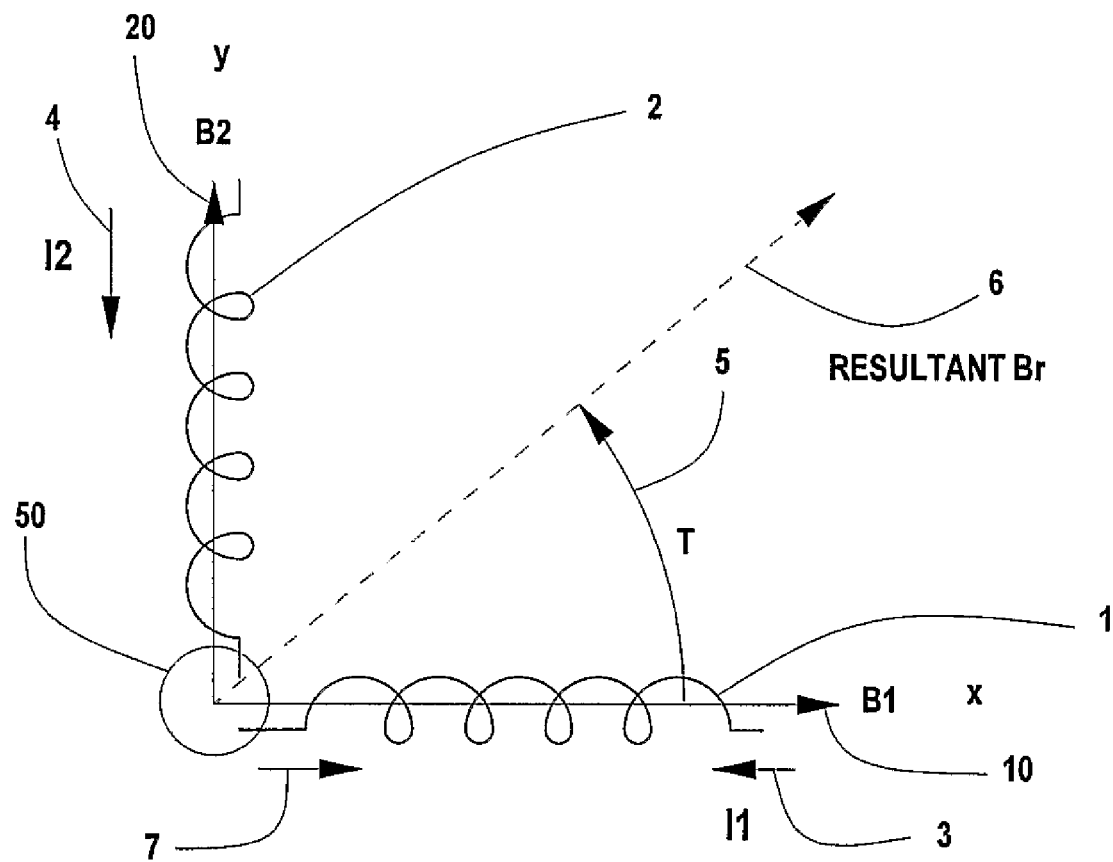
FIG. 1 A magnetic cross-coil air core gauge movement.

FIG. 1 shows an electromagnetic coil arrangement for a cross-coil air core movement that can be used to rotate a speedometer or tachometer pointer in a vehicular instrument gauge. Currents 3 and 4 in coils 1 and 2 develop component magnetic fields 10 and 20, generally, but not necessarily, along orthogonal directions B1, B2 or coordinate axes x and y; a resultant magnetic field 6 is developed at an angle 5, shown referenced to direction B1. The usual arrangement is for one or more coils to be wound on a bobbin with winding slots at 90° with respect to each other. A diametrically magnetized rotor magnet 50 is approximately centered within the coils, mounted on an axle (not shown), and is free to rotate into alignment with the resultant magnetic vector. FIG. 1 is a vectorial depiction of the components, the resultant, and a symbolic position of a rotor magnet, but it does not show the physical arrangement in an actual instrument gauge. U.S. Pat. Nos. 4,492,920 and 6,132,532 provide a detailed description of an air-core gauge, included a cross-coil gauge design and those skilled-in-the-art know the physical details.

The direction tangent of the resultant magnetic field in FIG. 1 is proportional to the ratio of the magnitudes of the magnetic fields 10 and 20 developed by cross-coil currents 3 and 4 in coils 1 and 2. The strength of the resultant magnetic field density $B_c$ developed at the center of a coil wound around a bobbin is denoted by $B_c = k \cdot N \cdot I$ where k is a geometric and units constant, N is the number of turns in the coil, and I is current through the coil. Each component field direction is along the axis of its generating coil. A resultant magnetic vector created by two magnetic vectors is calculated by the well-known general physics equation for torque balance, $B_1 \sin(T-A) + B_2 \sin(T-C) = 0$, where $B_1 = (k \cdot N \cdot I)_1$
$B_2 = (k \cdot N \cdot I)_2$
T=angle of resultant
A=angle of coil 1
C=angle of coil 2

We can assume that the k's and N's are the same for both field coils, and FIG. 1 assumes that A=0, and C=90°. Then, $I_1 \sin(T) + I_2 \sin(T-90°) = 0$, or $I_1 \sin(T) - I_2 \cos(T) = 0$.

$\tan(T) = I_2/I_1$

A sine-cosine current relationship in a 90° coil system can develop a resultant magnetic field at any angle 5 within a full 360° field of rotation. In an air core gauge, the resultant field is used to rotate magnet 50 placed near the center of the coil system and a pointer is mounted on a shaft through the center of the magnet. This is the basic design for a vehicular speedometer or tachometer. Current 3 through coil 1 has to be reversed in direction, shown as current 7 in FIG. 1, in order to develop a resultant angle greater than 90°.

Figure 2:
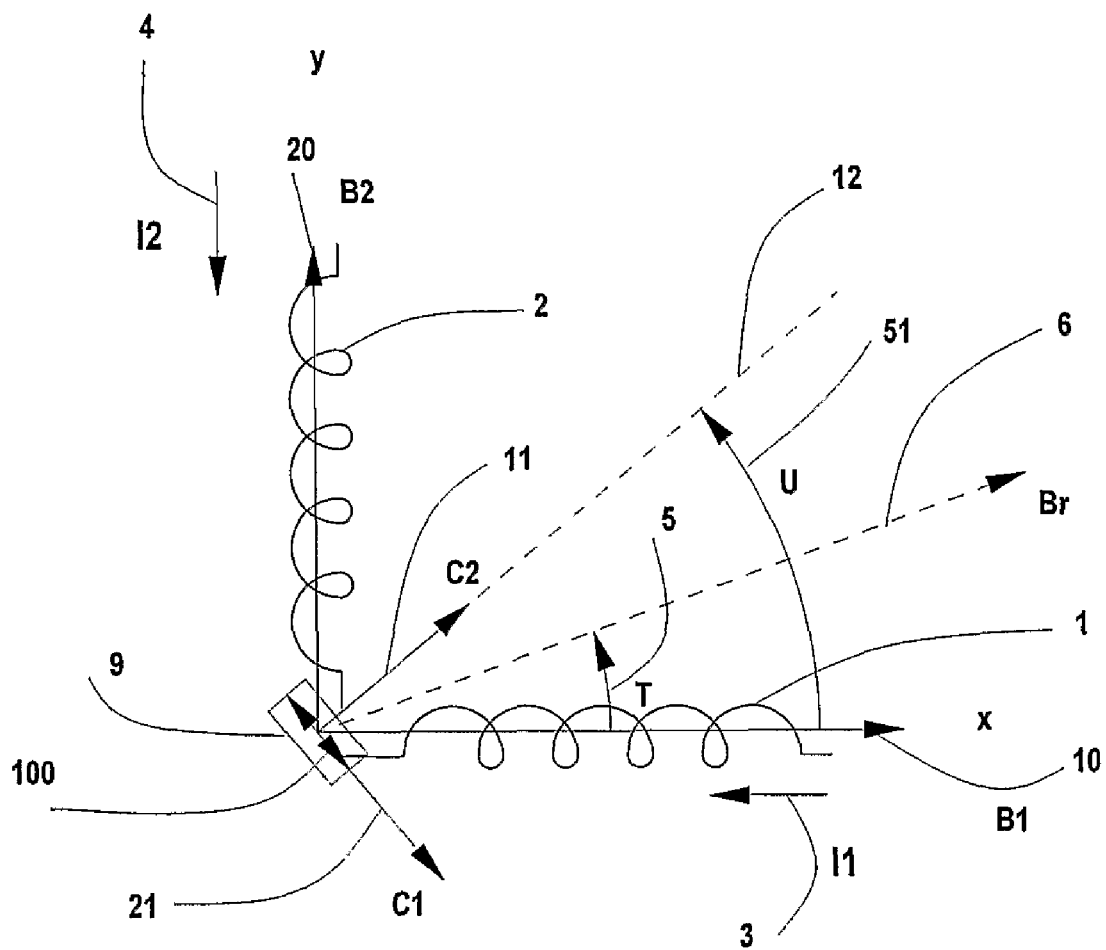
FIG. 2 An air core movement with a field sensor pivoted for rotation in the center region of a magnetic field.

FIG. 2 shows a magnetic sensor 9 replacing magnet 50. It's rotated by an actuator, not by magnetic fields generated with currents in coils 1 and 2. It can be rotated about the same axis as the axis of an air core gauge. The sensor 9 has a preferred magnetic field detection direction 100 along which the output signal of the sensor is a maximum for a collinear input field. If there is an external field at 90° to this sensitive axis, the sensor output signal is zero. A sensor in one embodiment is a GMR sensor or a combination of GMR sensors in a bridge arrangement. The same concept will work with other magnetic sensors, such as a Hall-effect sensor or a flux gate. A Hall-effect sensor may require a different mounting geometry for the sensitive axis direction. The sensor output may also experience a sign reversal when a field changes direction or it may act like a switch whenever a particular magnitude of the magnetic field vector crosses a threshold. A simple magnetic sensor will also be called a magnetic sensor, regardless of the output, and more complex sensor definitions including associated electronic circuits and signal processing methods will be understood by those skilled-in-the-art, and the meanings should be clear from the text.

The magnetic sensor 9 in FIG. 2 is connected to an actuator (not shown) that rotates the sensor 9 to an angle 51 about an axis centered on the gauge field origin. Currents 3 and 4 in coils 1 and 2 are adjusted until the sensor signal output is reduced to zero, or alternatively to a signal value indicating the magnetic flux matches a fixed trigger point value of the sensor. This is accomplished by adjusting currents so that the magnetic resultant 6 is aligned along direction 12, perpendicular to the sensitive axis 100 in the sensor. The magnitudes of currents needed to balance the sensor output signal to zero is a direct determination of the angle of the resultant field 6 required to match the sensor angle 51.

Two points are important: first a basic GMR sensor is much less temperature sensitive in the region of perpendicular or zero cross-over flux compared with other field angles, and second, the perpendicular angle of the sensor is not a function of the strength of the magnetic field. However, the strength of the field affects the angular resolution at the cross-over angle; the stronger the field, the smaller the misalignment angle that can be sensed. A GMR, Hall-effect, or any other magnetic sensor in the form of an integrated circuit can be modified into an Application Specific Integrated Circuit (ASIC) that can output a unique signal current for any combination of coil currents needed to balance the output signal to the actuator angle of the magnetic sensor.

Figure 3A:
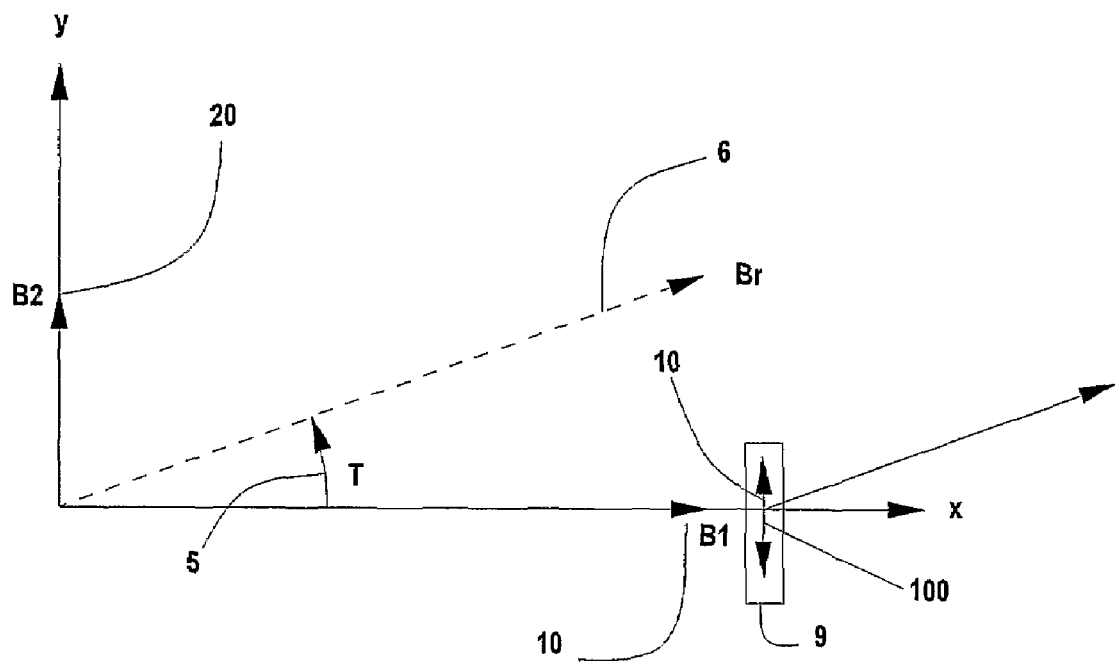
FIG. 3a Two magnetic field vector resultant and a sensor perpendicular to the x-axis.
Figure 3B:
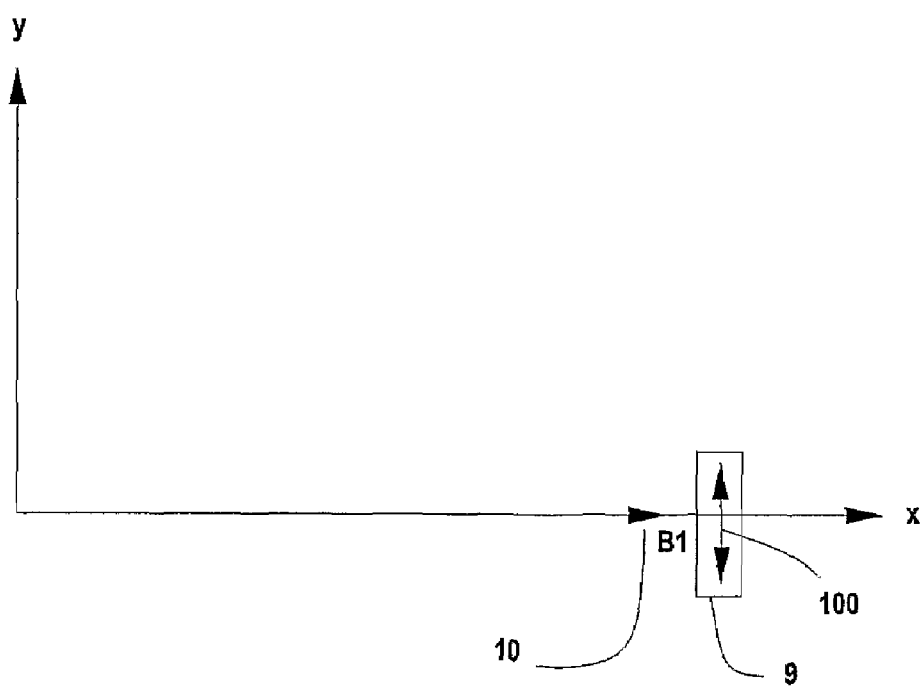
FIG. 3b Alignment of the resultant along the x-axis by zeroing the y-component of the magnetic vector, leaving only the x-component FIG. 3c Alignment of a magnetic vector perpendicular to the sensor at any angle by adjusting one or more vector components.

FIGS. 3a-3b show a specific example of the composition of component vectors needed to balance the output of a sensor. The sensor is shown at a distance from a pivot point at the origin of the coordinate system only for vector clarity. Its actual location in a device is not depicted. FIG. 3a shows a general vector resultant 6 developed from two magnetic field components 10 and 20. The sensor 9 is shown with a sensitive direction 100 (surface) perpendicular to the x-axis, and therefore perpendicular to the direction of field component 10. The direction of 6 is not perpendicular to the surface 100. FIG. 3b shows that reduction of component 20 to zero, leaving component 10 as the only component, satisfies the perpendicularity requirement needed for this sensor, and the sensor 9 puts out a zero value signal.

Figure 3C:
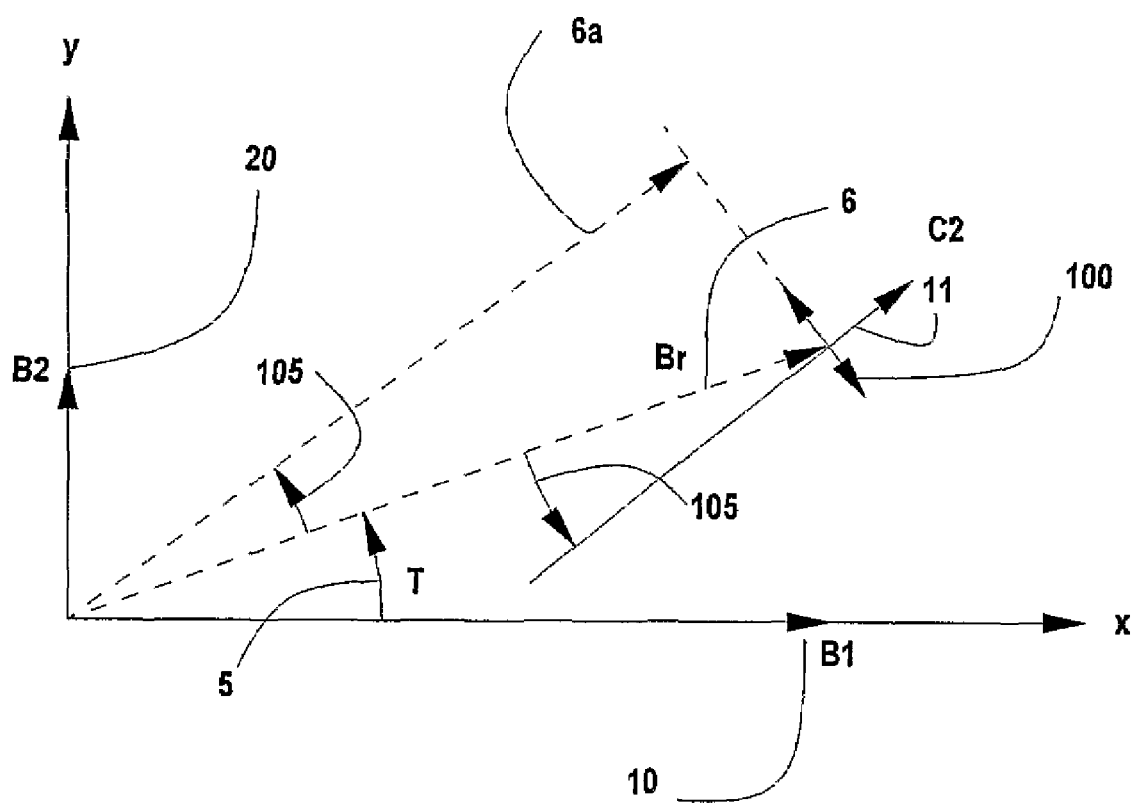

FIG. 3c shows a more general arrangement whereby sensor 9 is rotated by an actuator through an unknown angle relative to the x-axis. The initial angle of the resultant is shown as 5, and also with symbol T. At the new sensor angle, the initial resultant may not be perpendicular to the surface and has a component along direction 100. In order to make the resultant 6 perpendicular to the sensor surface, the field component 20 has to be increased relative to component 10. We need to increase the angle of the resultant by an angular amount shown as 105 in FIG. 3c. The ratio of currents in two field generation coils as shown in FIG. 1 is changed until the resultant vector is perpendicular to the sensor surface.

The magnetic sensor can be used as an element in a closed-loop feedback circuit where any sensor non-zero or change of state output causes currents to change, thereby modifying the direction of the detected field. This direction correction may also cause a change in magnitude of the resultant. A sensor primarily designed to be very sensitive may be used to control the direction of a resultant without much regard for the magnitude. At equilibrium the sensor outputs a zero voltage. Any small angular misalignment between the resultant magnetic field and the sensor is sensed as a non-balanced magnetic component and the closed-loop produces an output that controls primarily the direction of the detected field. On the other hand, a sensor with an offset flux threshold generating a two-state digital output may be sensitive to a change in magnitude that causes toggling of the output state from on-to-off or off-to-on at the same angle. In this case, it's necessary to keep the magnitude of the detected field resultant within a range that allows for a predetermined angular resolution and accuracy; the change in magnitude of an angular component projected onto the sensor active direction should ideally be much greater than the change in magnitude of the resultant vector as a function of angle.

Figure 4:
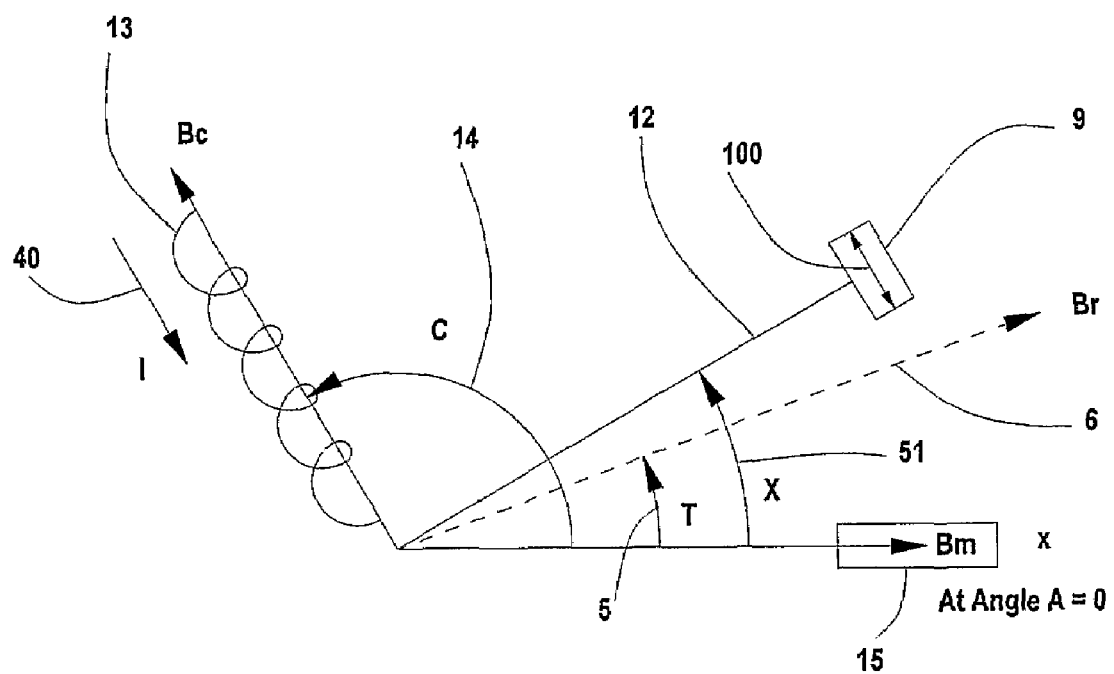
FIG. 4 A permanent magnet of strength $B_m$ at 0° and a coil at 12020 forming a resultant at an intermediate angle between 0° and 120°.

FIG. 4 shows an arrangement whereby the cross-coil gauge is replaced by a permanent magnet 15 and a single coil 13. It's no longer referred to as a cross-coil design. The permanent magnet is positioned to point along the 0° direction, or the x-axis, and the vector field from the single coil 13 points along the 120° direction as measured from the x-axis. The sensor 9 is still rotated by an actuator and is still for convenience in illustration shown at a distance from the pivot center. It should be placed at the pivot center. The permanent magnet may be a diametrically magnetized annular ring at the bottom of the bobbin, or magnets placed on either side of the bobbin directing a field across the internal region of the bobbin, while passing through the sensor. For those skilled-in-the-art, this magnetic arrangement is very similar to a voltmeter instrument gauge. The resultant magnetic field direction set by the combination of the coil 13 and the permanent magnet 15 is given by the physics torque equation:

$$B_m \operatorname{Sin}(T-A) + B_c \operatorname{Sin}(T-C) = 0$$

where,
$B_m$=magnetic field strength of the permanent magnet.
$B_c$=magnetic field strength of the coil.
A=direction of the magnet field
C=direction of the coil field
T=direction of the resultant field For the arrangement in FIG. 4 we have:
A=0°
C=120°
$B_m$=strength of the magnet
$B_c$=kNI where,
k=constant
N=number of turns in the coil
I=current in the coil Substituting into the equation, $$B_m \operatorname{Sin}(T-0) + B_c \operatorname{Sin}(T-120) = 0$$

$$\text{or } B_m \operatorname{Sin}(T) + B_c [\operatorname{Sin}(T)\operatorname{Cos}(120) - \operatorname{Cos}(T)\operatorname{Sin}(120)] = 0$$

Using $\operatorname{Cos}(120) = -\frac{1}{2}$ and $\operatorname{Sin}(120) = 3^{1/2}/2$, we solve for Tan(T):

$$\operatorname{Tan}(T) = 3^{1/2} B_c / (2 B_m - B_c).$$

Referring to FIG. 4, current 40 (I) in coil 13 is changed until components $B_c$ and $B_m$ develop a resultant angle that matches the angle of the perpendicular with respect to sensitive axis 100 of the sensor; the angle 5 (T) is then equal to angle 51 (X). If $B_m$ is constant, the angle T is very close to being linearly proportional to $B_c$ over an angular range of 60°. The line defined by $$T = a(B_c/B_m) + b$$

is accurate within 1° when compared with T calculated from the Tan(T) equation over a range of 0<=T<=60 degrees. Since $B_c$ is proportional to current, the current I is reasonably linear with respect to angle T and is therefore linear with respect to angle X.

It's desirable to keep $B_m$ constant over temperature. This can be accomplished by using a magnet made from Samarium Cobalt, a material whose remanence (Br) is very stable over temperature. Since the coil develops a field density value $B_c$=kNI, we can adjust the value of $B_c$ by changing the value of current; the number of turns is fixed for any given coil.

Figure 5:
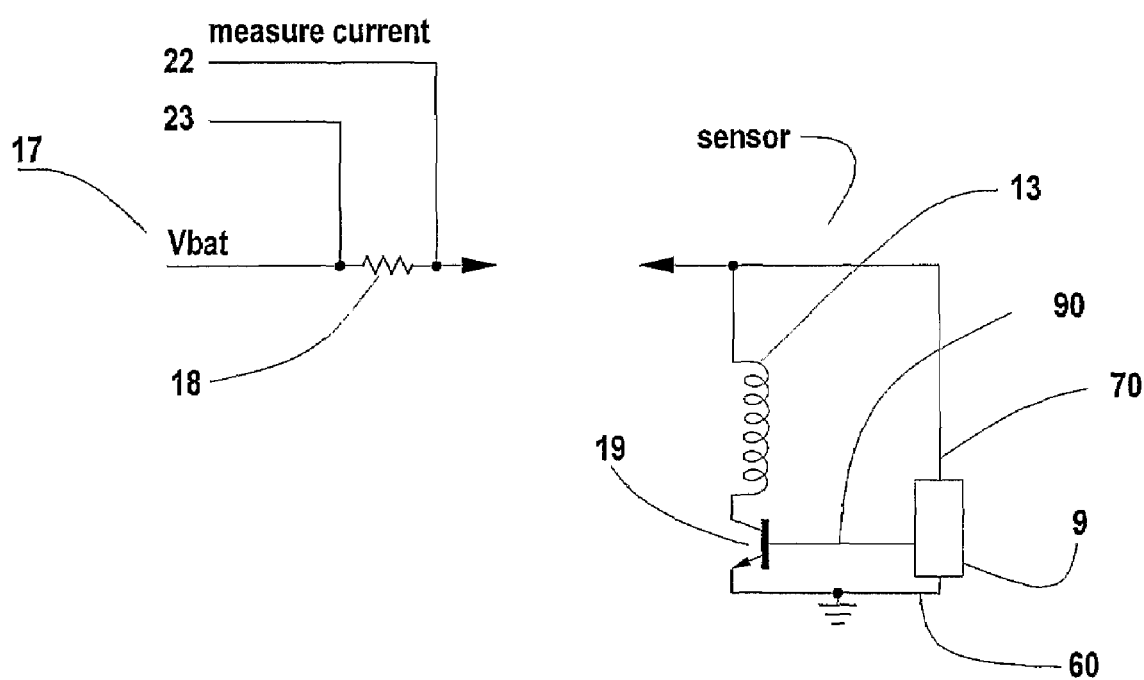
FIG. 5 A closed loop electronic circuit.

FIG. 5 shows a simple circuit that can be used in a closed-loop feedback circuit, using a two-wire connection from the assembly, e.g. a pedal position sensor or fuel level sender. The vehicle battery supply 17 is passed through a resistor 18 and fed to the sensor assembly. Voltage is supplied to the sensor 9 from connection 70 and also to coil 13. If the sensor angle 51 in FIG. 4 is at an angle greater than 0°, the transistor turns on and energizes the coil. This increases the resultant angle until the magnetic field turns off the sensor by reaching the perpendicular direction to the sensitive direction of the sensor. Signal output 90 turns off the transistor 19 and stops the flow of current through the coil. The average current flow needed to keep the average resultant angle perpendicular to the sensor angle passes through resistor 18. Measurement of the voltage drop across this resistor is a measure of the current and hence the sensor angle.

Figure 6:
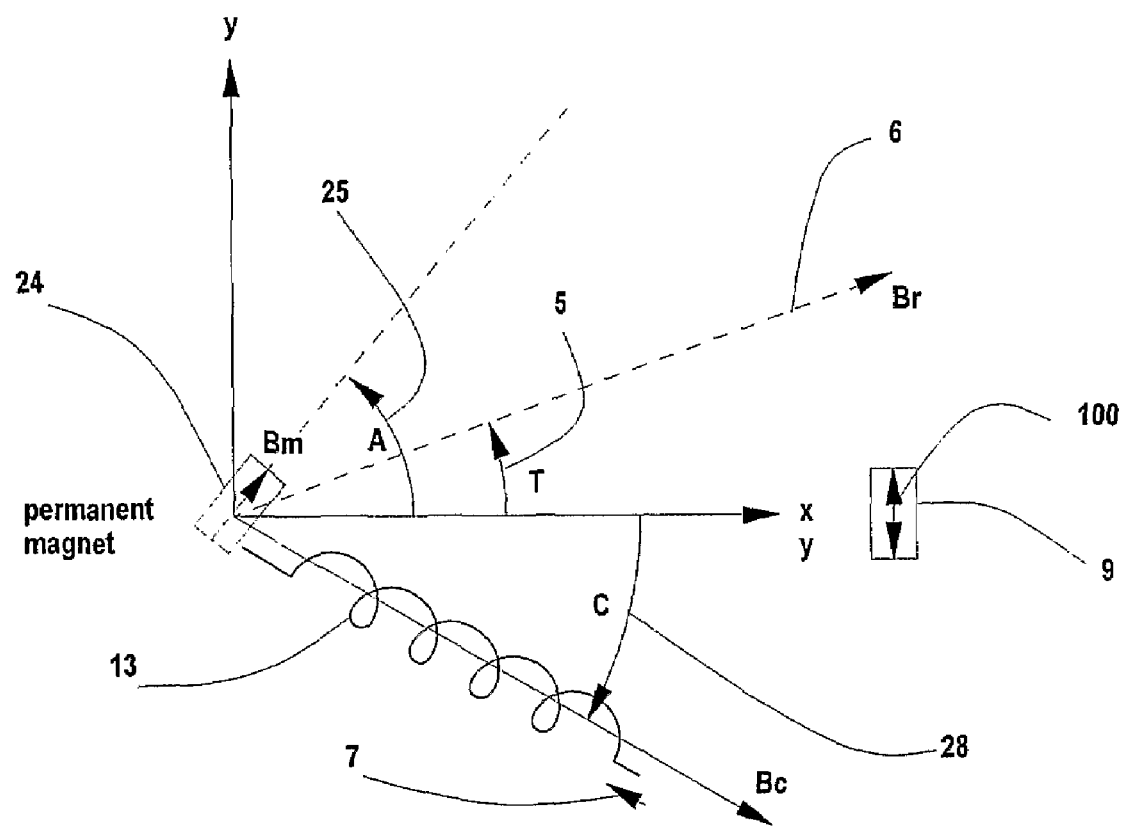
FIG. 6 Fixed sensor with permanent magnet rotated by actuator.

FIG. 6 shows an embodiment in which the sensor 9 does not rotate. The sensor is fixed at 0° where it's oriented so that a magnetic field vector pointing along the 0° direction (x-axis) develops a zero signal output from the sensor. In another embodiment where the sensor acts as a toggled switch triggered at a specific threshold value of magnetic flux, the sensor angle may be set at an angle different from 90° with respect to the x-axis. Rotation of the field resultant in either direction from the x-axis switches the sensor from one state to another, subject to any error caused by sensor hysteresis. The magnetic density $B_c$ developed by coil 13 is a vector at angle C that is designed to be −30° for purposes of calculation. A magnet 24 is rotated by an actuator to angle 25. Ideally, the magnet is a ring magnet surrounding the sensor, but not necessarily co-planar; the ring magnet may be displaced along the axis rotated by the actuator. FIG. 6 illustrates this embodiment vectorially rather than as an actual physical embodiment. The magnetic resultant direction is determined by the field $B_m$ of the permanent magnet 24 coupled with the field $B_c$ developed by coil 13. The sensor develops a zero output signal when the coil is energized with enough current to develop a resultant field that is perpendicular to the sensitive axis 100 of the sensor, or along the x-axis. Again, the torque equation yields, $B_m \sin(T-A) + B_c \sin(T-C) = 0$, where A=unknown angle of the actuator magnet
C=−30°
T=resultant angle=0° for balance For this case we solve for Bc:

$B_m \sin(0-A) + B_c \sin(0+30) = 0$ $-B_m \sin(A) + B_c/2 = 0$ $B_c = 2B_m \sin(A)$ Current in coil 13 is
I=(2$B_m$/kN) Sin(A)

The Sine of angle 25 (A) is proportional to current. Again, the magnet must be temperature stable, but the circuit is very simple. The same feedback circuit shown in FIG. 5 may also be used for this embodiment.

A GMR sensor array can be used in place of a single GMR sensor or bridge. A two component GMR sensor array as described in U.S. Pat. Nos. 6,104,187 and 6,433,535 teach that a resultant angle having zero temperature drift can be found. That desired resultant angle can be used as well as 0°. A similar two-component GMR array set at 45° with respect to each other is sold by Philips Corporation, and is used as part of an angular measurement system. The cost of this sensor is estimated at less than $0.50 for 2 million units.

Figure 7:
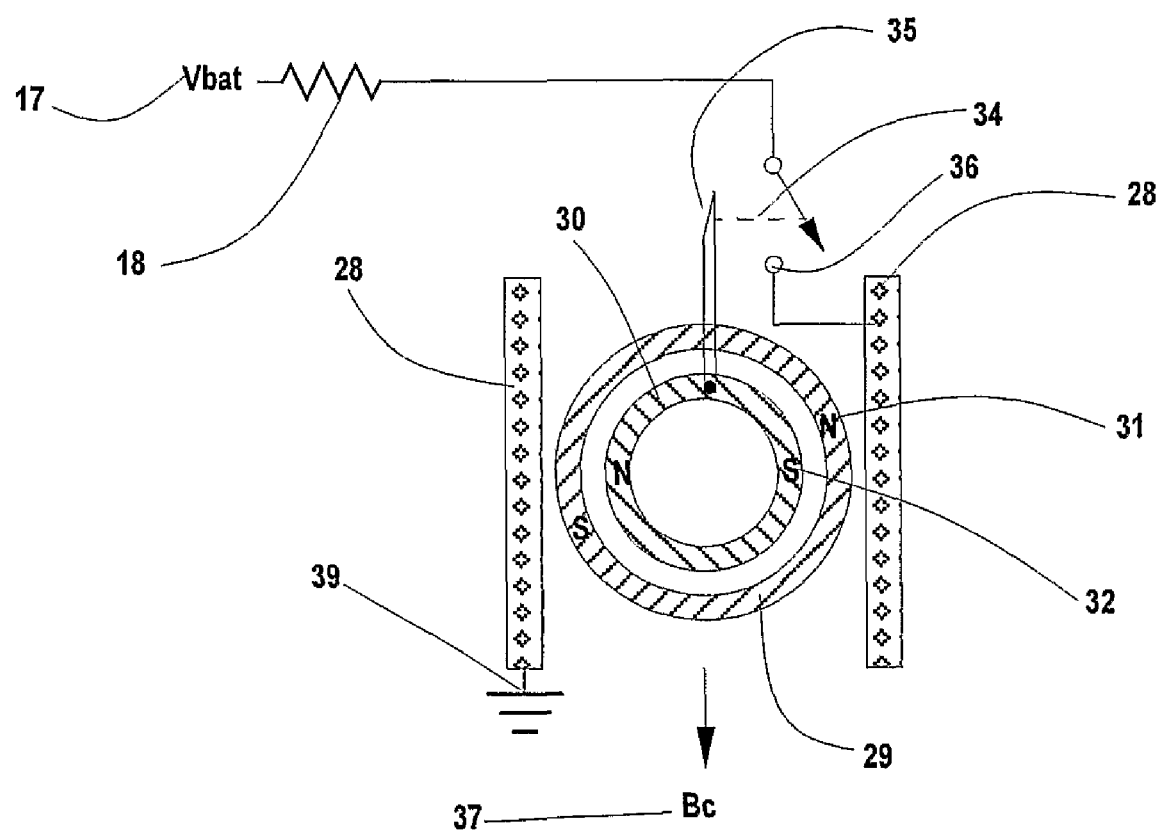
FIG. 7 A dual magnet field balance with an off-on sensor switch.

Another embodiment of the force or field balance concept doesn't involve a true electronic sensor, but instead uses a single point electrical contact, mechanically actuated. FIG. 7 shows a first magnet 29 that is rotated by an actuator (not shown) to an angle with respect to the horizontal or x-axis direction. Rotation of magnet 29 exerts a torque on a second magnet 30 that tries to rotate into magnetic alignment with magnet 29. Both magnets are magnetized diametrically and magnet 30 has a circumferentially opposite magnetic pole 32 with respect to magnetic pole 31 of magnet 29. If magnet 29 rotates in the counterclockwise direction (CCW), magnet 30 tries to follow in the same direction. Magnet 30 is limited to a small angular range of movement such as +5° with respect to its initial position; the stops are not shown. A magnetic density field $B_c$ generated by coil 28 is at an absolute angle of 90° with respect to the field direction of magnet 30 when magnet 30 is aligned along the horizontal or x-axis. The magnetic field from the coil exerts a torque on magnet 30 opposite in direction to the torque exerted by magnet 29. This causes magnet 30 to rotate clockwise (CW). Current in the coil must be sufficient to rotate magnet 30 against the CCW torque exerted by magnet 29, and sufficiently strong until a mechanical lever 35 toggles a simple switch 34 to open, thereby shutting off current to the coil from contact 36. Then, magnet 30 begins to rotate forward (CCW) towards rotated magnet 29, thereby causing closure of the switch. The closed switch once again causes current to flow through coil 28. Current in the coil is switched on and off, developing an average current as a function of how quickly the magnet can move back and forth between the two switch positions. The current control circuit may be a sawtooth pattern where the amount of time from 0 to the current value along the sawtooth needed to change the state of the switch is accurately known. This can readily be converted to a PWM signal. The average current of a PWM signal defines the return torque needed to hold the second magnet in an average closed position. Therefore this defines the angle between the magnet 29 and magnet 30. The relationship between current in the coil and the angle of the actuator is a Sine function, but the angle is easily calculated with additional electronics.

This embodiment is similar to the "points" in a car, or the electrical bimetallic vibrator originally used to reduce voltage to an instrument cluster from a 12 volt battery to the originally designed cluster for 6 volts. These products lasted a very long time. With modern materials, this may be the most inexpensive method of measuring angle while still satisfying the requirement for a long operational lifetime. Carbon nanoparticles or fullerenes may provide lifetime oscillations in the billions of cycles, sufficient to survive more than 200,000 miles of driving for modern vehicle sensors.

Figure 8:
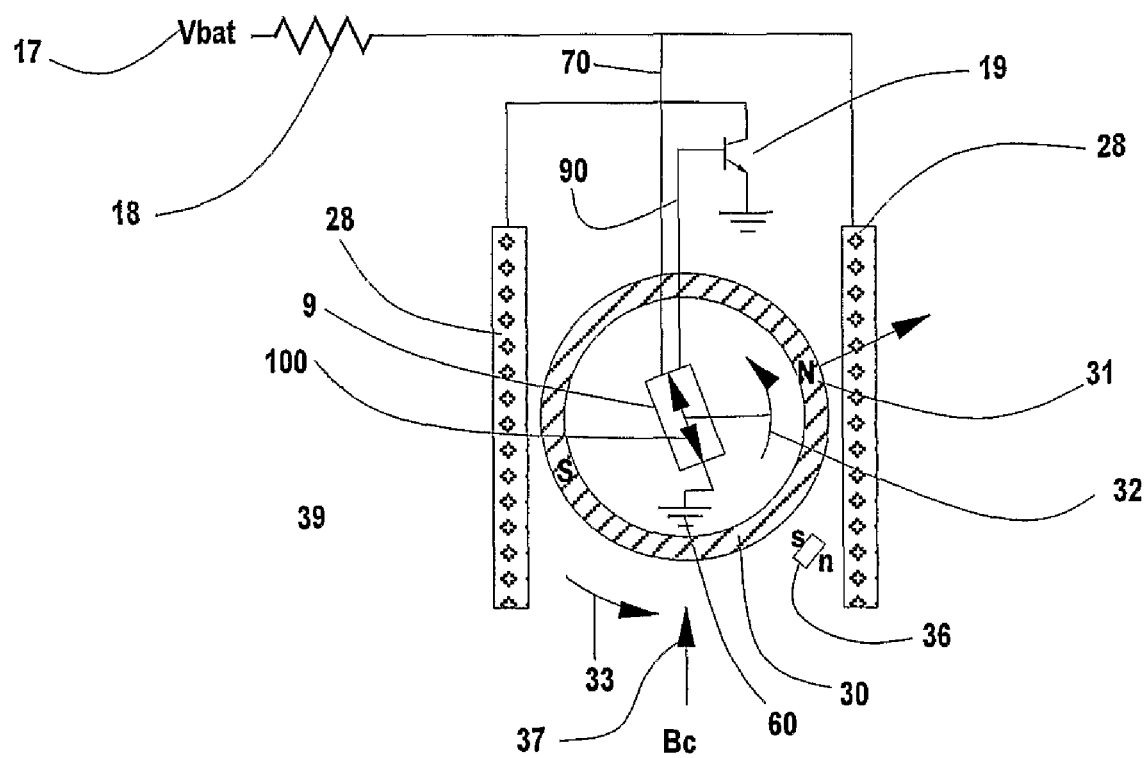
FIG. 8 Rotating a magnet with a magnetic field generated by a coil in order to amplify the field detected.

FIG. 8 shows a modification of FIG. 7. Magnet 30 is free to rotate through an angle greater than the angular limit in FIG. 7. A return-to-zero (RTZ) magnet 36 exerts a torque to keep magnet 30 aligned along a fixed, magnetized direction of magnet 36 unless magnet 30 is rotated counterclockwise (CCW) by applying a non-zero current through coil 28 in the opposite direction with respect to FIG. 7. The embodiments shown in FIGS. 8 and 4 operate in a very similar way with the major exception that adjusted current in coil 28 of FIG. 8 develops a magnetic field that exerts torque to rotate magnet 30 CCW away from the magnetic direction of magnet 36, as in a vehicular voltmeter. This torque exists until magnet 30 rotates enough to cause its magnetic vector direction to be perpendicular to the sensitive direction 100 of sensor 9 at which angle the sensor has a zero output signal. The resultant is made up of the field of magnet 36 and field $B_c$ coil 28 at a fixed direction, shown as 37 in FIG. 8. Permanent magnet 30, when aligned with the perpendicular to the sensor line 100, provides a much greater magnetic field than normally available from the resultant of the coil field and that of magnet 36. This is a way of effectuating the closed-loop with a less sensitive sensor, such as a Hall-effect sensor.

When the invention is embodied in a fuel level sender that is disposed inside a fuel tank, it's exposed to liquid fuel and fuel vapor. It may be necessary to seal some components, such as an integrated circuit magnetic sensor, against chemical interaction with fuel. Examples of sealing are given in U.S. Pat. No. 6,851,315 and US 2004/0003660. A magnetic field can penetrate materials that are nonferrous, and the description given is applicable to magnetic sensors sealed against fuel and fuel vapor. Some components, e.g. coils, magnets, and wires, may be coated with a protective finish, but don't have to be sealed as extensively as materials used is some integrated circuits. Those skilled-in-the-art will know which components must be protected against fuel and those that do not.

While a presently preferred embodiment of the invention has been illustrated and described, it should be appreciated that principles of the invention apply to all embodiments falling within the scope of the following claims.

The invention claimed is:

1. A position disclosing device comprising:
   an electric circuit containing a sensor for sensing a directional component of a vector representing a field or force produced by a source;
   a positionable input for relatively changing the directional component of the vector from a reference magnitude or reference direction as the input is being positioned over a range of positions;
   the electric circuit being operable to change the value of an electric signal for restoring the directional component being sensed by the sensor to the reference magnitude or reference direction as the input is being positioned; and
   an output providing for the value of the electric signal to disclose the position of the input.

2. A device as set forth in claim 1 wherein the positionable input comprises a positionable element having an operative connection for selectively positioning the sensor relative to the source.

3. A device as set forth in claim 2 wherein the sensor comprises a GMR sensor.

4. A device as set forth in claim 2 wherein the sensor comprises a Hall-effect sensor.

5. A device as set forth in claim 2 wherein the sensor comprises an AMR.

6. A device as set forth in claim 2 wherein the sensor comprises a flux gate.

7. A device as set forth in claim 2 wherein the source comprises multiple magnetic sources a first of which creates a first magnetic field vector referenced to a coordinate system and a second of which creates a second magnetic field vector referenced to the coordinate system, and the first and second field vectors cooperatively form a resultant vector having the directional component that is sensed by the sensor.

8. A device as set forth in claim 7 wherein the first of the multiple magnetic sources comprises a coil connected in the electric circuit.

9. A device as set forth in claim 8 wherein the second of the multiple magnetic sources comprises a permanent magnet.

10. A device as set forth in claim 9 wherein the coil magnetic field vector is disposed in the coordinate system at 120 degrees relative the magnetization axis of the permanent magnet.

11. A device as set forth in claim 8 wherein the second of the multiple magnetic sources comprises a coil carrying electric current.

12. A device as set forth in claim 11 wherein the coil of the second of the multiple magnetic sources is connected in the electric circuit.

13. A device as set forth in claim 1 wherein the positionable input comprises a positionable element having an operative connection to the source for selectively positioning the source relative to the sensor.

14. A device as set forth in claim 13 wherein the source comprises a permanent magnet and a coil that is connected in the electric circuit, and the sensor comprises a sensor for sensing the directional component of the vector as a directional component of a magnetic field vector that is the summation of a magnetic field vector from the permanent magnet and a magnetic field vector from the coil.

15. A device as set forth in claim 14 wherein the positionable element is operatively connected to the permanent magnet for selectively positioning the permanent magnet relative to the coil.

16. A device as set forth in claim 15 wherein the coil axis is disposed in a coordinate system at 30 degrees relative to the location of the sensor.

17. A device as set forth in claims 16 wherein the permanent magnet is positionable in the coordinate system over a range of at least 30 degrees.

18. A device as set forth in claim 1 wherein the electric circuit comprises a feedback loop from the sensor to a control element in the electric circuit that changes the value of the electric signal.

19. A device as set forth in claim 1 wherein the control element in the electric circuit changes the value of an electric current that flows serially through a resistance and a coil whose magnetic field controls the directional component being sensed by the sensor.

20. A device as set forth in claim 19 wherein the control element in the electric circuit comprises a switch.

21. A device as set forth in claim 20 wherein the switch comprises an electronic switching device.

22. A device as set forth in claim 20 wherein the switch comprises a mechanical switching device.

23. A device as set forth in claim 1 wherein the source comprises a first magnet and a second magnet magnetically coupled, the positionable input positions a first of the magnets relative to a second for relatively changing the directional component of the vector field of the second magnet, and the sensor comprises a switch that adjusts current through a coil to cause the coil's magnetic field to restore the directional component of the vector field of the second magnet.

24. A device as set forth in claim 23 wherein one of the magnets is positionable and the other magnet is positionable over a limited range based on the position of the one magnet and current flow through the coil.

25. A device as set forth in claim 1 wherein the source comprises a positionable magnet subject to the influence of a RTZ magnet and the field generated by current in the coil controlled by the sensor.

26. A method for disclosing position of a positionable input comprising:
    positioning the input over a range of positions to cause the magnitude of the directional component of a vector representing a field or force produced by a source to change from a reference magnitude or reference direction as the input is being positioned while an electric circuit that contains a sensor for sensing the directional component is changing the value of an electric signal that, as the input is being positioned, is restoring the magnitude of the directional component being sensed by the sensor to the reference magnitude or reference direction; and
    using the value of the electric signal to disclose the position of the input.

* * * * *